(12) United States Patent
Bunker et al.

(10) Patent No.: US 10,619,488 B2
(45) Date of Patent: Apr. 14, 2020

(54) ENGINE COMPONENT ASSEMBLY

(71) Applicant: General Electric Company, Schenectady, NY (US)

(72) Inventors: Ronald Scott Bunker, West Chester, OH (US); Jonathan Michael Rausch, West Chester, OH (US); Emily Rosette Clark, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 341 days.

(21) Appl. No.: 15/522,832

(22) PCT Filed: Oct. 27, 2015

(86) PCT No.: PCT/US2015/057577
§ 371 (c)(1),
(2) Date: Apr. 28, 2017

(87) PCT Pub. No.: WO2016/069599
PCT Pub. Date: May 6, 2016

(65) Prior Publication Data
US 2017/0335693 A1     Nov. 23, 2017

Related U.S. Application Data

(60) Provisional application No. 62/073,449, filed on Oct. 31, 2014.

(51) Int. Cl.
| F01D 5/18 | (2006.01) |
| F01D 9/04 | (2006.01) |
| F01D 25/12 | (2006.01) |
| F01D 9/06 | (2006.01) |

(52) U.S. Cl.
CPC .............. *F01D 5/187* (2013.01); *F01D 9/041* (2013.01); *F01D 9/065* (2013.01); *F01D 25/12* (2013.01);
(Continued)

(58) Field of Classification Search
CPC . F01D 9/041; F01D 5/18; F01D 5/187; F01D 9/065; F01D 25/12
See application file for complete search history.

(56) References Cited

U.S. PATENT DOCUMENTS 3,777,484 A * 12/1973 Dibelius ................. F23R 3/002
                                                     60/757
5,615,546 A * 4/1997 Althaus ................... F23R 3/002
                                                     60/752
(Continued)

FOREIGN PATENT DOCUMENTS

EP        0 648 979 A1     4/1995

OTHER PUBLICATIONS

International Search Report and Written Opinion issued in connection with corresponding PCT Application No. PCT/US2015/057577, dated Jan. 14, 2016.
(Continued)

*Primary Examiner* — Charles G Freay
*Assistant Examiner* — Lilya Pekarskaya
(74) *Attorney, Agent, or Firm* — McGarry Bair PC (57) ABSTRACT

An engine component assembly includes an engine component having a hot surface in thermal communication with a hot combustion gas flow and a cooling surface in fluid communication with a cooling fluid flow. Multiple, non-linear channels are provided on the cooling surface of the engine component. At least a portion of the cooling fluid flow is orthogonal to an extension axis of the channels.

18 Claims, 6 Drawing Sheets

(52) U.S. Cl.
CPC ......... *F05D 2220/32* (2013.01); *Y02T 50/676* (2013.01)

(56) References Cited

U.S. PATENT DOCUMENTS

| | | | | |
|---|---|---|---|---|
| 8,591,190 | B2* | 11/2013 | Tibbott | F01D 5/187 |
| | | | | 416/97 R |
| 8,683,814 | B2* | 4/2014 | Xu | F01D 5/186 |
| | | | | 415/115 |
| 9,957,816 | B2* | 5/2018 | Bunker | F02C 7/18 |
| 2012/0177478 | A1 | 7/2012 | Giri et al. | |
| 2012/0272653 | A1* | 11/2012 | Merrill | F23M 5/08 |
| | | | | 60/754 |

OTHER PUBLICATIONS

International Preliminary Report on Patentability issued in connection with corresponding PCT Application No. PCT/US2015/057577, dated May 2, 2017

Preethi, P.H. et al., Angled impingement insert with discrete cooling features, GE Co-Pending U.S. Appl. No. 62/004,685, filed May 29, 2014

Bunker, R.S., et al., Angled impingement insert for particulate accumulation mitigation, GE Co-Pending U.S. Appl. No. 62/004,723, filed May 29, 2014.

Kulkarni, A.J., et al., Angled impingement with channel cooling features, GE Co-Pending U.S. Appl. No. 62/004,697, filed May 29, 2014.

Bunker, R.S., et al., Counterflow impingement cooling assembly, GE Co-Pending U.S. Appl. No. 62/004,709, filed May 29, 2014.

Bunker, R.S., et al., Angled impingement inserts with cooling features, GE Co-Pending U.S. Appl. No. 62/004,718, filed May 29, 2014.

Stover, C.S., et al., Shroud assembly for a turbine engine, GE Co-Pending U.S. Appl. No. 62/073,555, filed Oct. 31, 2014.

Bergholz, R.F., et al., Engine component assembly, GE Co-Pending U.S. Appl. No. 62/073,527, filed Oct. 31, 2014.

Bunker, R.S., et al., Engine component assembly, GE Co-Pending U.S. Appl. No. 62/073,564, filed Oct. 31, 2014.

\* cited by examiner

ENGINE COMPONENT ASSEMBLY

BACKGROUND OF THE INVENTION

Turbine engines, and particularly gas or combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for airplanes, including helicopters. In aircraft, gas turbine engines are used for propulsion of the aircraft. In terrestrial applications, turbine engines are often used for power generation.

Gas turbine engines fir aircraft are designed to operate at high temperatures to maximize engine thrust, so cooling of certain engine components, such as the high pressure turbine and the low pressure turbine, may be necessary. Typically, cooling is accomplished by ducting cooler air from the high and/or low pressure compressors to the engine components which require cooling. Temperatures in the high pressure turbine are around 1000° C. to 2000° C. and the cooling fluid from the compressor is about 500 to 700° C. While the compressor air is a high temperature, it is cooler relative to the turbine air, and may be used to cool the turbine. When cooling the turbines, cooling fluid may be supplied to various turbine components, including the interior of the turbine blades and the turbine shroud.

Engine components have been cooled using different methods, including conventional convection cooling and impingement cooling. In conventional convection cooling, cooling fluid flows along a cooling path through the component, and heat is transferred into the flowing air. In impingement cooling, a cooling surface, typically an inner surface, of the component is impinged with high velocity air in order to transfer more heat by convection than with typical convection cooling.

Particles, such as dirt, dust, sand, and other environmental contaminants, in the cooling fluid can cause a loss of cooling and reduced operational time or "time-on-wing" for the aircraft environment. This problem is exacerbated in certain operating environments around the globe where turbine engines are exposed to significant amounts of airborne particles. In the most severe cases the entire cooling surface of the shroud becomes coated with particles, with the additional negative impact of film hole blockage.

BRIEF DESCRIPTION OF THE INVENTION

In one aspect, the invention relates to an engine component assembly, having a first engine component having a hot surface in thermal communication with a hot combustion gas flow and a cooling surface in fluid communication with a cooling fluid flow, wherein the cooling surface is different than the hot surface, and multiple non-linear channels provided on the cooling surface and having a general direction of extension defining an extension axis. At least some of the multiple non-linear channels are oriented relative to the cooling fluid flow such that at least a portion of the cooling fluid flow is orthogonal to the extension axis.

DESCRIPTION OF EMBODIMENTS OF THE INVENTION

The described embodiments of the present invention are directed to cooling an engine component, particularly in a turbine engine. For purposes of illustration, the present invention will be described with respect to an aircraft gas turbine engine. It will be understood, however, that the invention is not so limited and may have general applicability in non-aircraft applications, such as other mobile applications and non-mobile industrial, commercial, and residential applications.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to a direction toward the rear or outlet of the engine relative to the engine centerline.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

All directional references (e.g., radial, axial, proximal, distal, upper, lower, upward, downward, left, right, lateral, front, back, top, bottom, above, below, vertical, horizontal, clockwise, counterclockwise) are only used fir identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

Figure 1:
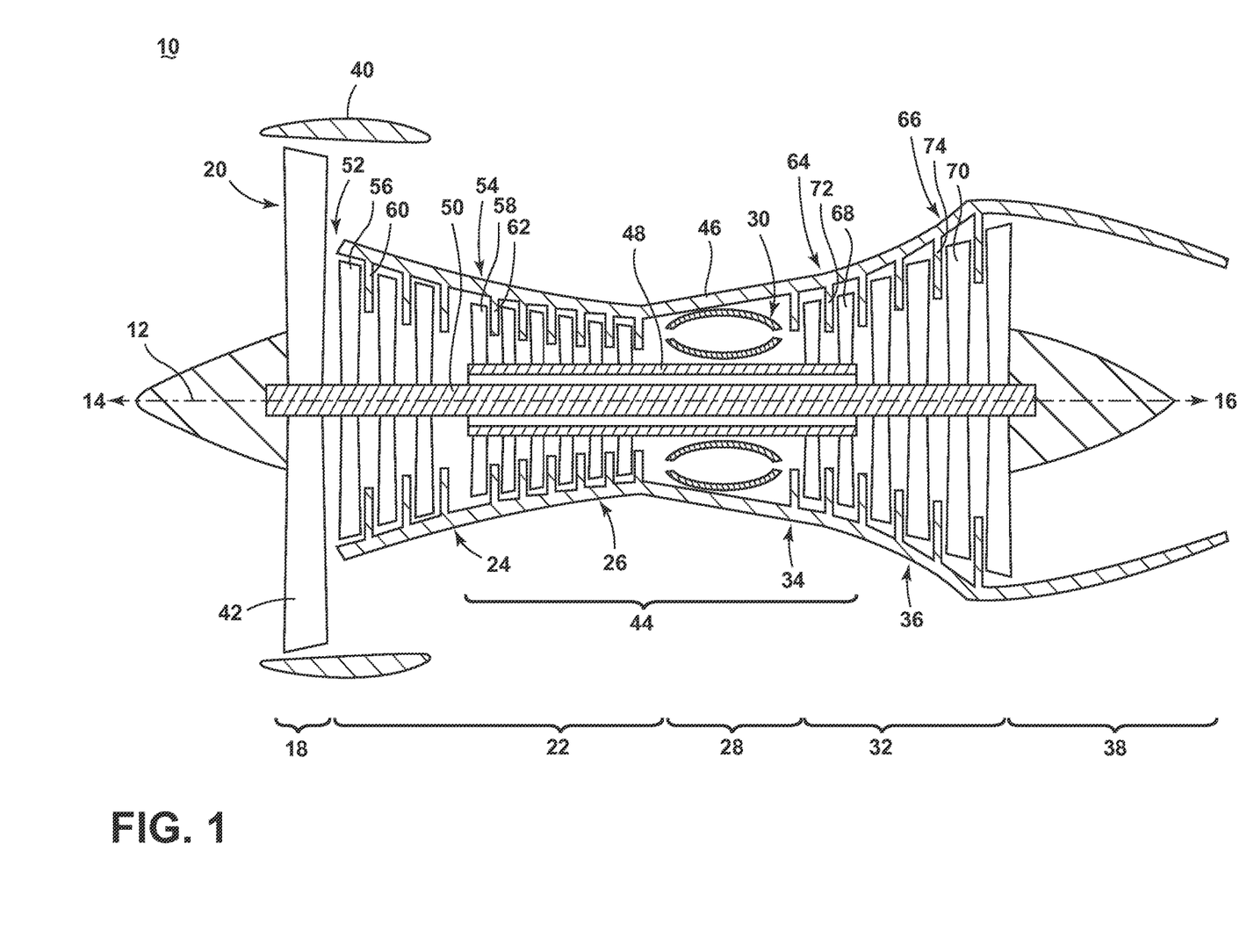
FIG. 1 is a schematic cross-sectional diagram of a gas turbine engine for an aircraft.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12.

The HP compressor 26, the combustor 30, and the HP turbine 34 form a core 44 of the engine 10 which generates combustion gases. The core 44 is surrounded by core casing 46 which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the compressor 24 and fan 20.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 may be provided in a ring and may extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 may be provided in a ring and may extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 may bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid may be, but is not limited to, fluid discharged from the LP compressor 24 or the HP compressor 26.

Figure 2:
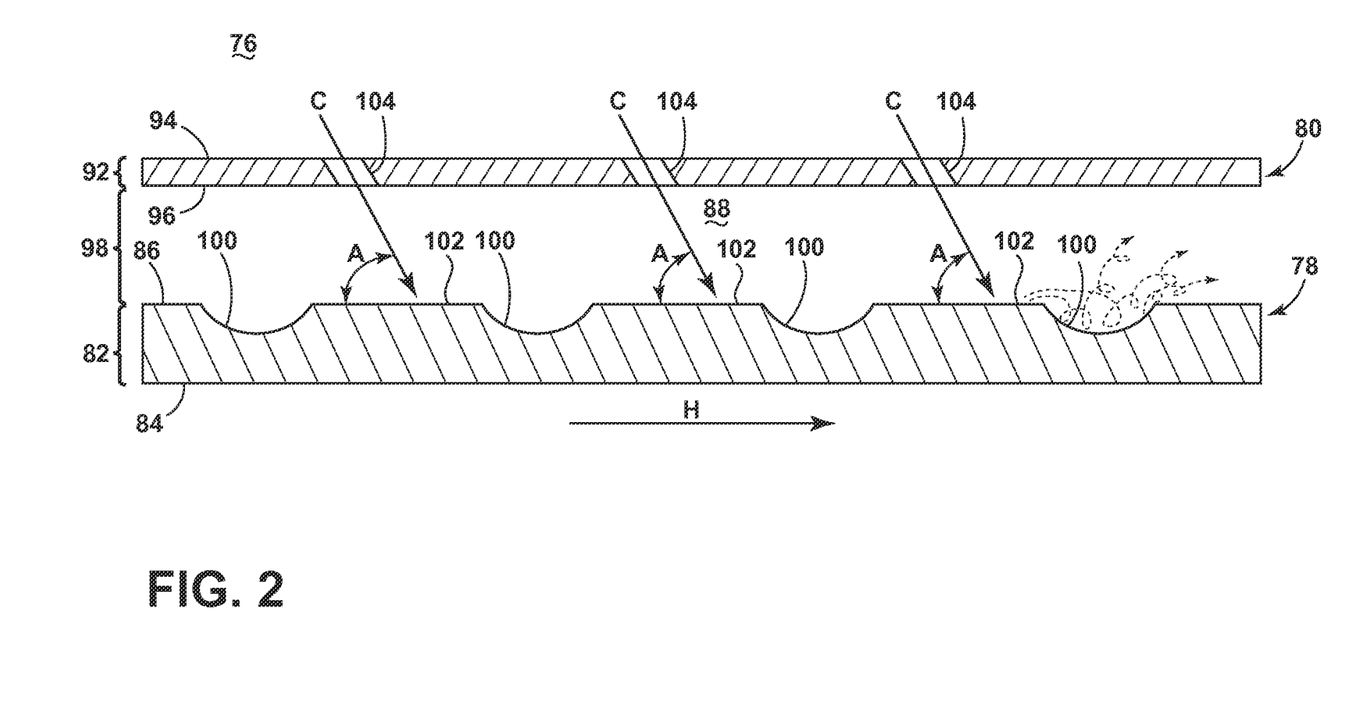
FIG. 2 is a schematic cross-sectional view showing a generic engine component assembly of the engine from FIG. 1 according to a first embodiment of the invention.

FIG. 2 is a schematic view showing an engine component assembly 76 of the engine 10 from FIG. 1 according to first embodiment of the invention. The engine component assembly 76 includes a first engine component 78 and a second engine component 80.

The first engine component 78 can be disposed in a flow of hot gases represented by arrow H. A cooling fluid flow, represented by arrows C may be supplied to cool the first engine component 78. As discussed above with respect to FIG. 1, in the context of a turbine engine, the cooling fluid can be ambient air supplied by the fan 20 which bypasses the engine core 44, fluid discharged from the LP compressor 24, or fluid discharged from the HP compressor 26. Some non-limiting examples of the first engine component 78 include a blade, a nozzle, vane, shroud, combustor liner, or combustor deflector. Other non-limiting examples where film cooling is used include turbine transition ducts and exhaust nozzles.

The first engine component 78 includes a substrate 82 having a hot surface 84 facing the hot combustion gas H and a cooling surface 86 facing cooling fluid flow C. The first engine component 78 can define at least one interior cavity 88 comprising the cooling surface 86. The hot surface 84 may be an exterior surface of the engine component 78. In the case of a gas turbine engine, the hot surface 84 may be exposed to gases having temperatures in the range of 1000° C. to 2000° C. Suitable materials for the substrate 82 include, but are not limited to, steel, refractory metals such as titanium, or super alloys based on nickel, cobalt, or iron.

While not illustrated herein, the first engine component 78 can further include a plurality of film holes that provide fluid communication between the interior cavity 88 and the hot surface 84 of the engine component 80. During operation, cooling fluid C is supplied to the interior cavity 88 and out of the film holes to create a thin layer or film of cool air on the hot surface 84, protecting it from the hot combustion gas H.

The second engine component 80 includes a substrate 92 having a first surface 94 in fluid communication with the cooling fluid flow C and a second surface 96 that is spaced from the cooling surface 86 and defines a space 98 between the second surface 96 and the cooling surface 86. Some non-limiting examples of the second engine component 80 include a wall, baffle, or insert within a blade, a nozzle, vane, shroud, combustor liner, or combustor deflector. For example, second engine component 80 can comprise a baffle, with the substrate 92 comprising wall of the baffle that is located within the interior cavity 88 of the first engine component 78, with the space 98 being formed from at least a portion of the interior cavity 88.

The cooling surface 86 can be provided with multiple channels 100. The channels 100 increase the surface area of the cooling surface 86 for heat transfer as well as increase the vortical flows and turbulence in the cooling fluid flow C to avoid stagnation points. The channels 100 can be spaced from each other to define at least one intervening space 102 on the cooling surface 86.

The second engine component 80 further includes one or more cooling aperture(s) 104 through which the cooling fluid flow C passes and is directed toward the cooling surface 86 of the first engine component 78. In the illustrated embodiment, multiple cooling apertures 104 are provided. The cooling apertures 104 of the second engine component 80 can be oriented such that the cooling fluid flow C is directed at the intervening spaces 102 to impinge on the intervening spaces 102. This allows the cooling fluid flow C to travel over and down the channel 100 without stagnating; for clarity, this air path is shown by arrows in only the right-most channel 100 in FIG. 2. Keeping the cooling fluid flow C moving reduces particle accumulation, and also introduces flow vortices or turbulence which enhances the convective cooling capability.

The cooling fluid flow C can form an impingement angle A relative to the intervening spaces 102, which may be determined by the configuration of the cooling apertures 104. For example, a cooling aperture 104 oriented normal to the cooling surface 86 results in an impingement angle A of approximately 90 degrees. A cooling aperture 104 that is non-orthogonal to the cooling surface 86, as shown in FIG. 2, results in an impingement angle A that is less than 90 degrees, which reduces the stagnation region of the cooling fluid flow C, limiting the amount of particle build-up on the first engine component 78. More specifically, the impingement angle A can be greater than 0 degrees, and still more specifically, the impingement angle A can range from 45 to 60 degrees.

The cooling aperture 104 can define a streamline, indicated by the arrows in FIG. 2, for the cooling fluid flow C exiting the cooling aperture 104. The streamline may be collinear with the centerline of the cooling aperture 104, particularly in cases where the cooling aperture 104 is circular or otherwise symmetrical, as in the illustrated embodiment. In case where the cooling aperture 104 is irregular or asymmetrical, the streamline may diverge from the centerline. The impingement angle A may be defined with respect to the streamline of the cooling fluid flow C exiting the cooling aperture 104 or with respect to the centerline of the cooling aperture 104.

Figure 3:
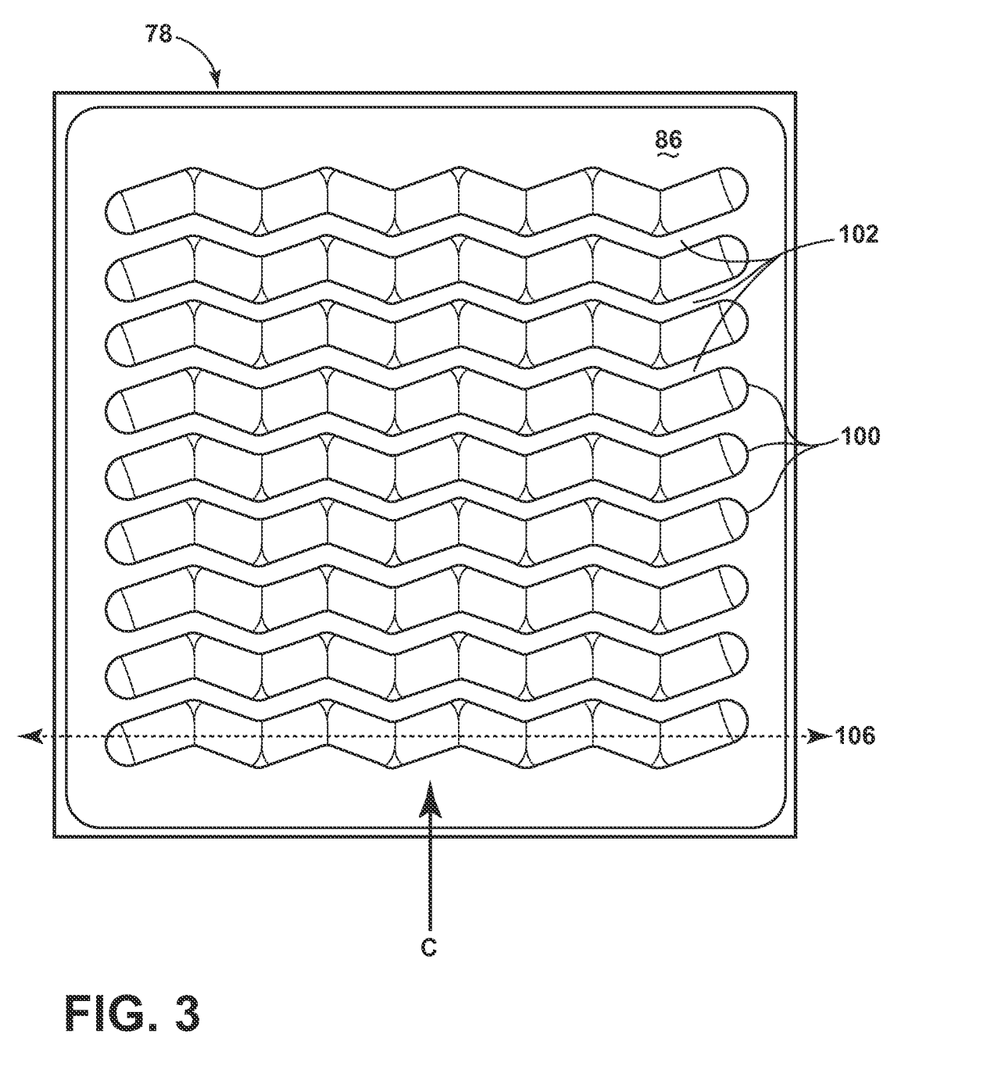
FIG. 3 is a plan view showing a cooling surface of an engine component for the engine component assembly of FIG. 2.

FIG. 3 is a plan view of the cooling surface 86 of the first engine component 78. The channels 100 are non-linear, and have a general direction of extension defining an extension axis 106. At least some of the channels 100 are oriented relative to the cooling fluid flow C such that at least a portion of the cooling fluid flow C over the cooling surface 86 is orthogonal to the extension axis 106.

Figure 4:
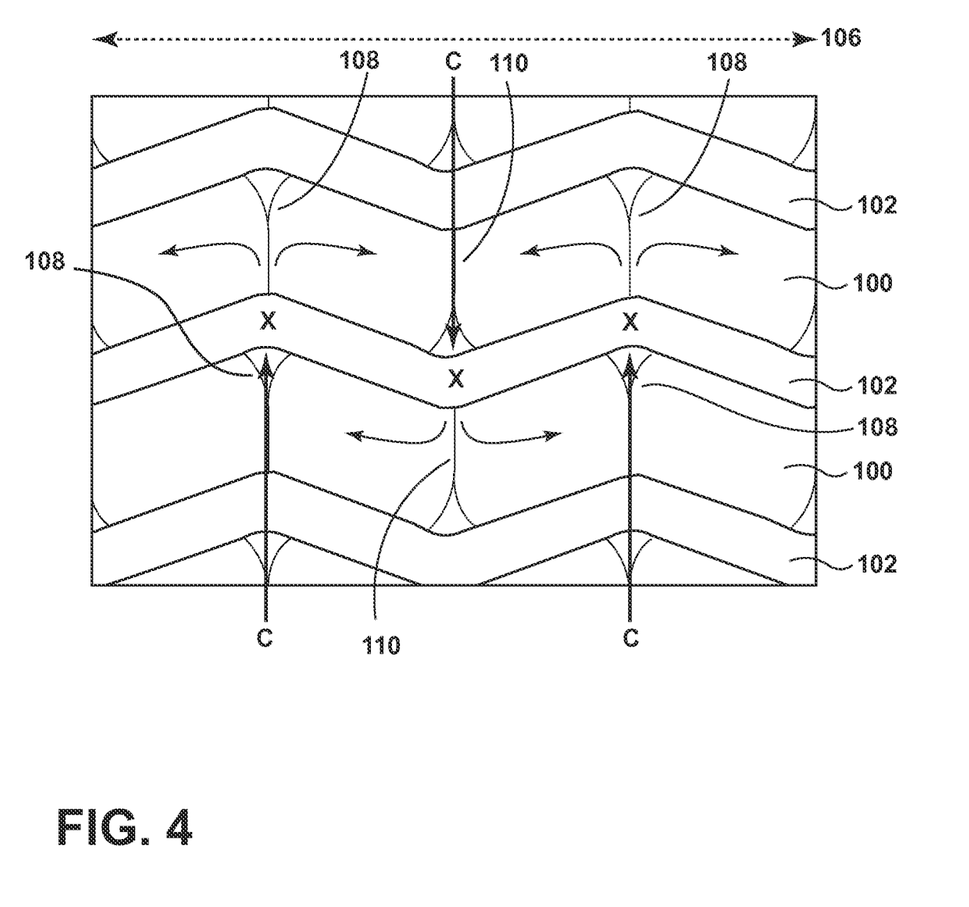
FIG. 4 is a close-up view of a portion of FIG. 3.

FIG. 4 is a close-up view of a portion of FIG. 3. The channels 100 can have first portions which are aligned to define a first cross-channel structure, and second portions which are aligned to define a second cross-channel structure. In the illustrated embodiment, the channels 100 can comprise a series of repeating peaks 108 and valleys 110, with the peaks 108 and valleys 110 of adjacent channels 100 being aligned, respectively, and wherein the aligned peaks 108 form the first cross-channel structure and the aligned valleys 110 form the second cross-channel structure. The cooling fluid flow C can flow over the peaks 108 in a first direction and over the valleys 110 in a second direction. Thus, the cooling fluid flow C may travel in either direction with respect to the extension axis 106.

Some exemplary impingement locations in the intervening spaces 102 are marked with an "X" in FIG. 4. The cooling fluid flow C that impinges on the intervening spaces 102 can travel over and within the channels 100 generally along the extension axis 106. The peaks 108 and valleys 110 can be equally spaced along the extension axis 106, such that the size of the intervening space 102 remains constant along the extension axis 106; alternatively, the size of the intervening space 102 can vary along the extension axis 106. Only a few impingement locations X are shown in FIG. 4; the cooling fluid flow C may impinge elsewhere on the cooling surface, including in various locations on the intervening spaces 102 or within the channels 100 themselves.

As shown in FIGS. 3-4, the channels 100 can have a wave-shaped plan form. The wave-shaped plan illustrated has a saw-tooth shape, with each channel 100 following, or approximately following, a sawtooth wave having angled transitions between the peaks 108 and valleys 110.

Figure 5:
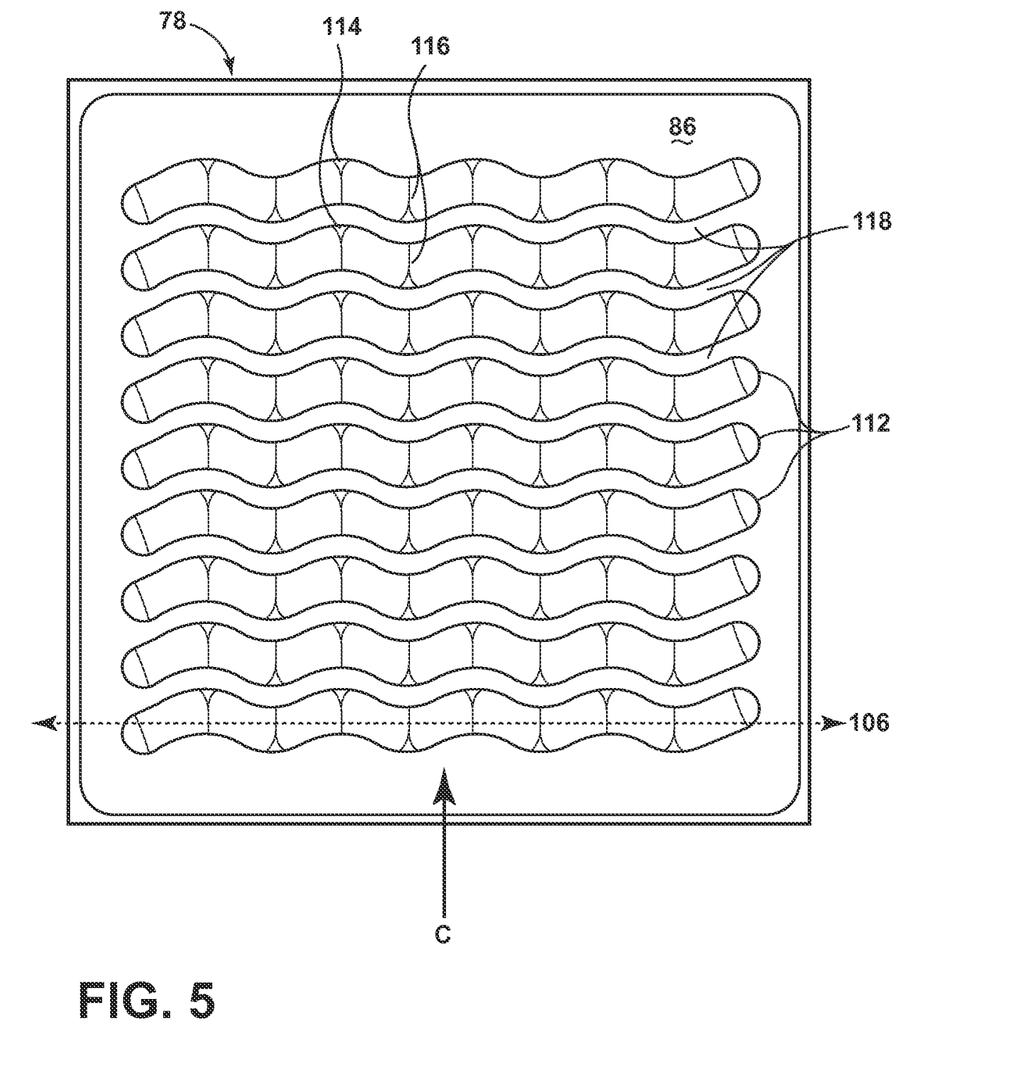
FIG. 5 is a plan view showing a cooling surface of an engine component according to a second embodiment of the invention.

FIG. 5 is a plan view showing a cooling surface 86 of an engine component 78 according to a second embodiment of the invention. The second embodiment is substantially similar to the first, and like elements are identified with the same reference numbers. In the second embodiment, the cooling surface 86 is provided with multiple non-linear channels 112 having a wave-shaped plan form with a sinusoidal shape, with each channel 112 following, or approximately following, a sine curve. The channels 112 include a series of smoothly repeating peaks 114 and valleys 116. The channels 112 are spaced from each other to define at least one intervening space 118 on the cooling surface 86. The peaks 114 and valleys 116 can be equally spaced along the extension axis 106, such that the size of the intervening space 118 remains constant along the extension axis 106; alternatively, the size of the intervening space 118 can vary along the extension axis 106.

Figure 6:
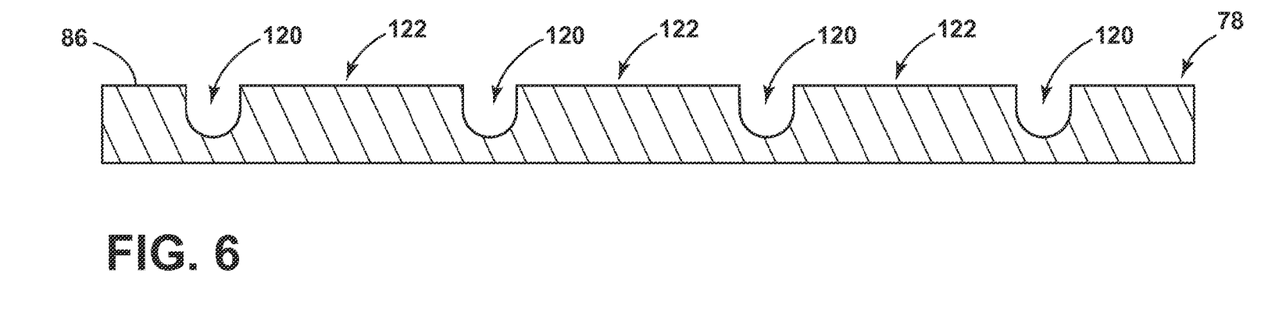
FIG. 6 is a schematic cross-sectional view showing a cooling surface of an engine component according to a third embodiment of the invention.
Figure 7:
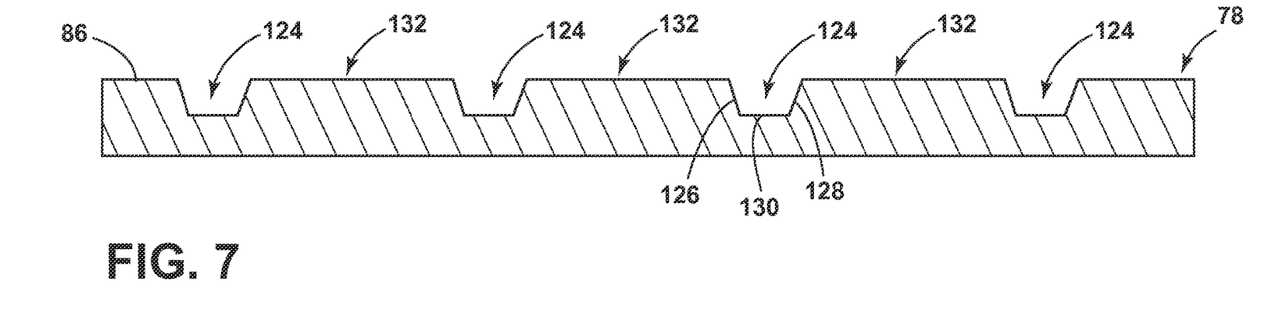
FIG. 7 is a schematic cross-sectional view showing a cooling surface of an engine component according to a fourth embodiment of the invention.
Figure 8:
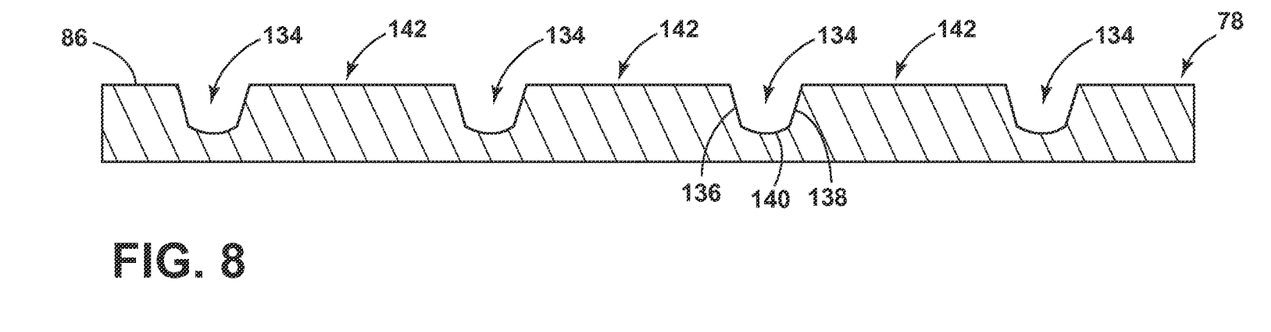
FIG. 8 is a schematic cross-sectional view showing a cooling surface of an engine component according to a fifth embodiment of the invention.

The non-linear channels of any of the above embodiments can have a predetermined cross-sectional shape. For example, the channels 100 shown in FIG. 2 are generally hemispherical, or include a partial segment of a hemisphere. FIGS. 6-8 show some other predetermined shapes for the non-linear channels.

In FIG. 6, the cooling surface 86 of the first engine component 78 is provided with multiple non-linear channels 120 having a generally hemi-ovoid or hemiellipsoid shape. The channels 120 are spaced from each other to define intervening spaces 122 on the cooling surface 86.

In FIG. 7, the cooling surface 86 of the first engine component 78 is provided with multiple non-linear channels 124 having a beveled shape, in which at least one side wall 126, 128 of the channel 124 is set at an angle relative to a planar bottom wall 130. The channels 124 are spaced from each other to define intervening spaces 132 on the cooling surface 86.

In FIG. 8, the cooling surface 86 of the first engine component 78 is provided with multiple non-linear channels 134 also having a beveled shape, but at least one side wall 136, 138 of the channel 134 is set at an angle relative to a curved bottom wall 140. The channels 134 are spaced from each other to define intervening spaces 142 on the cooling surface 86.

Further, a single engine component 78 can be provided with one or more of the cross-sectional shapes shown in FIGS. 2 and 6-8. Furthermore, a single channel can be provided with a combination of cross-sectional shapes. For example, one side wall can be beveled as shown in FIGS. 7-8 and the other side wall can be straight, as shown in FIG. 6.

In any of the above embodiments, it is understood that while the drawings may show the non-linear channels having sharp corners, edges, and transitions for purposes of illustration, is may be more practical for the corners, edges, and transitions to be smoothly radiused or filleted to avoid the formation of stagnation points. It is also understood that other configurations of non-linear channels can be provided as well, including ones having a repeating shape along the extension axis 106, such as peaks and valleys, or ones that have non-repeating, but still nonlinear, shape along the extension axis 106.

Furthermore, in any of the above embodiments, a protective coating, such as a thermal barrier coating, can be applied to the hot surface 84 of the first engine component 78. Also, the present invention may be combined with shaping or contouring of film holes in the first engine component 78.

The various embodiments of systems, methods, and other devices related to the invention disclosed herein provide improved cooling for turbine engine components. One advantage that may be realized in the practice of some embodiments of the described systems is that effective impingement cooling of engine components is achieved while reducing or eliminating the particle accumulation. Some engine components are reliant on impingement of cooling fluid on the surface of the component opposite the surface exposed to the hot combustion gas in order to maintain an acceptable metal temperature and meet life requirements. Prior designs relying on impingement cooling typically direct a high velocity air jet at an angle normal (90 degrees) to the cooling surface in combination with cast-in raised features on the cooling surface, such as bumps in the case of HP turbine shrouds. The raised features increase the cooling surface area, allowing more heat to be removed from the shroud. However, the 90 degree impingement creates a stagnation location at the strike point of the air jet on the cooling surface. This stagnation region collects particles, which acts as an insulator on the engine component. Raised features on the cooling surface increase the amount of particles that accumulate on the component, further reducing the ability for the component to be cooled by impingement. Directing the impingement at an angle to the surface of the component can reduce stagnation, but by angling the cooling jet, the heat transfer coefficient associated with the impingement is reduced. The utilization of angled impingement with wave-form channels in the present invention reduces particle accumulation while maintaining component cooling effectiveness. This effectiveness can increase the time-on-wing (TOW) for the turbine engine.

Another advantage that may be realized in the practice of some embodiments of the described systems and methods is that additional flow to the cooling circuit is not required to maintain the same metal temperature achieved with other designs.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An engine component assembly, comprising:
a first engine component having a hot surface in thermal communication with a hot combustion gas flow and a cooling surface in fluid communication with a cooling fluid flow, wherein the cooling surface is different than the hot surface; and
multiple non-linear channels provided on the cooling surface having a general direction of extension defining an extension axis, wherein at least some of the multiple non-linear channels are oriented relative to the cooling fluid flow such that at least a portion of the cooling fluid flow is orthogonal to the extension axis, wherein the multiple non-linear channels have first portions, which are aligned to define a first cross-channel structure, and second portions, which are aligned to define a second cross-channel structure, and wherein the cooling fluid flow flows over the first cross-channel structure in a first direction and flows over the second cross-channel structure in a second direction, which is different than the first direction.

2. The engine component assembly of claim 1, wherein at least some of the multiple non-linear channels have a wave-shaped plan form.

3. The engine component assembly of claim 2, wherein the wave-shaped plan form comprises one of a saw-tooth shape or a sinusoidal shape.

4. The engine component assembly of claim 1, wherein at least some of the multiple non-linear channels are spaced from each other to define at least one intervening space.

5. The engine component assembly of claim 4 further comprising at least one cooling aperture through which the cooling fluid flow passes prior to reaching the multiple non-linear channels, wherein the at least one cooling aperture is oriented such that the cooling fluid flow is directed at the at least one intervening space.

6. The engine component assembly of claim 5, wherein the cooling fluid flow forms an impingement angle relative to the at least one intervening space.

7. The engine component assembly of claim 6, wherein the impingement angle measured from the cooling surface to the cooling fluid flow is less than 90 degrees and greater than 0 degrees.

8. The engine component assembly of claim 5 further comprising multiple cooling apertures directing the cooling fluid flow on the at least one intervening space.

9. The engine component assembly of claim 5 further comprising a second engine component having a first surface in fluid communication with the cooling fluid flow and a second surface, different from the first surface, spaced from the cooling surface and defining a space between the second surface and the cooling surface of the first engine component.

10. The engine component assembly of claim 9, wherein the second engine component comprises a wall located within an interior of the first engine component.

11. The engine component assembly of claim 10, wherein the space is formed from at least a portion of the interior of the first engine component.

12. The engine component assembly of claim 11, wherein the at least one cooling aperture extends through the second engine component.

13. The engine component assembly of claim 1, wherein the first direction and the second directions are generally orthogonal.

14. The engine component assembly of claim 1, wherein the multiple non-linear channels comprise a series of repeating peaks and valleys.

15. The engine component assembly of claim 14, wherein at least some of the multiple non-linear channels have a predetermined cross section.

16. The engine component assembly of claim 15, wherein the predetermined cross section is at least one of generally hemispherical, elliptical, or beveled.

17. The engine component assembly of claim 1, wherein the first engine component comprises at least one of a nozzle, a vane, a blade, a shroud, a combustor liner, or a combustor deflector.

18. An engine component assembly, comprising:
- a first engine component comprising a substrate disposed in a flow of hot gasses having a hot surface in thermal communication with the flow of hot gasses and a cooling surface in fluid communication with a cooling fluid flow, wherein the cooling surface is different than the hot surface; and multiple non-linear channels provided on the cooling surface having a general direction of extension defining an extension axis, wherein at least some of the multiple non-linear channels are oriented relative to the cooling fluid flow such that at least a portion of the cooling fluid flow is orthogonal to the extension axis,
- wherein the multiple non-linear channels have first portions, which are aligned to define a first cross-channel structure comprising aligned peaks, and second portions, which are aligned to define a second cross-channel structure comprising aligned valleys, wherein the cooling fluid flow flows over the first cross-channel structure in a first direction and flows over the second cross-channel structure in a second direction, which is different than the first direction.

\* \* \* \* \*